US007733895B2

(12) United States Patent
Kesselman et al.

(10) Patent No.: US 7,733,895 B2
(45) Date of Patent: Jun. 8, 2010

(54) NON-PREEMPTIVE SCHEDULING IN NETWORK ELEMENTS

(75) Inventors: Alex Kesselman, Cambridge (GB); Kirill Kogan, Netanya (IL)

(73) Assignee: Cisco Technology, Inc., San Jose, CA (US)

( * ) Notice: Subject to any disclaimer, the term of this patent is extended or adjusted under 35 U.S.C. 154(b) by 954 days.

(21) Appl. No.: 11/253,022

(22) Filed: Oct. 17, 2005

(65) Prior Publication Data

US 2006/0115267 A1    Jun. 1, 2006

Related U.S. Application Data

(60) Provisional application No. 60/631,952, filed on Nov. 29, 2004.

(51) Int. Cl.
*H04L 12/28* (2006.01)
*H04L 12/56* (2006.01)
*H04L 1/00* (2006.01)
*H04L 12/26* (2006.01)

(52) U.S. Cl. .................. 370/416; 370/235; 370/237; 370/238; 370/231

(58) Field of Classification Search ......... 370/230–231, 370/235, 237–238, 412–418
See application file for complete search history.

(56) References Cited

U.S. PATENT DOCUMENTS

2001/0026558 A1 * 10/2001 Kamiya ...................... 370/443

OTHER PUBLICATIONS

N. McKeown, "The iSLIP Scheduling Algorithm for Input-Queued Switches," IEEE/ACM Transactions on Networking, vol. 7, No. 2, pp. 188-201, Apr. 1999.
Bertossi, Bongiovanni and Bonuccelli. Time Slot Assignment in SS/TDMA systems with intersatellite links. *IEEE Trans. on Communication*, 35:602-608. 1987.
C. C. Ribeiro et al., "An Optimal Column-Generation-with-Ranking Algorithm for Very Large Scale Set Partitioning Problems in Traffic Assignment," European Journal of Operational Research, vol. 41, pp. 232-239, 1989.
Gopal and Wong. Minimizing the Number of Switchings in a SS/TDMA System. *IEEE Trans. Communication*, 33:497-501, 1985.

(Continued)

*Primary Examiner*—Ronald Abelson
(74) *Attorney, Agent, or Firm*—Hickman Palermo Truong & Becker LLP

(57) ABSTRACT

A graph based on a data traffic matrix represents the occupancy of a set of virtual output queues to an optical crosspoint packet data switch. Edges in the graph are assigned to a matching in order of decreasing weight, provided that the edges do not conflict with other edges previously placed in the matching. If a conflict is found for a particular edge, a new matching is created and the conflicting edge is placed in the new matching. The process iterates until all edges are covered, resulting in creating a collection of matchings. The collection of matchings is transformed into a schedule such that each matching defines a switch configuration and the weight of the heaviest edge determines its holding time. The length of the obtained schedule equals the total cost of the collection. The cost of the collection is the total weight of the matchings plus the product of the re-configuration delay and the number of matchings.

32 Claims, 7 Drawing Sheets

OTHER PUBLICATIONS

Shlomi Dolev et al., "Bounded Latency Scheduling Scheme for ATM Cells," Proceedings of the 4th IEEE Symposium on Computers and Communications (ISCC'99), pp. 273-277.

Ganz and Gao. Efficient Algorithms for SS/TDMA scheduling. *IEEE Trans. on Communication*, 38:1367-1374. 1992.

Bonuccelli, Gopal and Wong. Incremental Time Slot Assignement in SS/TDMA satellite systems. *IEEE Trans. on Communication*, 39:1147-1156. 1991.

Inukai. An Efcient SS/TDMA Time Slot Assignment Algorithm. *IEEE Trans. on Communication*, 27:1449-1455, 1979.

V. Vokkarane et al., "Segmentation-Based Non-Preemptive Scheduling Algorithms for Optical Burst-Switched Networks," University of Texas at Dallas, 2003, pp. 1-12.

F. Afrati et al., "Scheduling in switching networks with set-up delays," Athens University of Economics & Business, Athens, Greece, pp. 1-6, 2003.

Li and Hamdi, $\lambda$-Adjust Algorithm for Optical Switches with Reconguration Delay. *Proc. of ICC'03*.

Crescenzi, Deng and Papadimitriou. On Approximating a Scheduling Problem, *Journal of Combinatorial Optimization*, 5:287-297, 2001.

Towles and Dally. Guaranteed Scheduling for Switches with Conguration Overhead. *Proc. of INFOCOM'02*.

A. Kesselman et al., "Non-Preemptive Scheduling of Optical Switches," paper presented at IEEE Globecom Conference, Dallas, Nov. 30, 2004, pp. 1-6.

A. Kesselman et al., "Non-Preemptive Scheduling of Optical Switches," slide presentation presented at IEEE Globecom Conference, Dallas, Nov. 30, 2004, pp. 1-25.

M. Prais et al., "Reactive GRASP: An Application to a Matrix Decomposition Problem in TDMA Traffic Assignment," Informs Journal on Computing, vol. 12, pp. 164-176, 2000.

\* cited by examiner (A)

OUTPUTS j1, j2, ... jn

| | | | | |
|---|---|---|---|---|
| 10 | 20 | 100 | 30 | 50 |
| 100 | 10 | 10 | 10 | 5 |
| 16 | 22 | 34 | 21 | 19 |
| 25 | 102 | 33 | 22 | 54 |
| 6 | 8 | 10 | 12 | 14 |
| 100 | 62 | 44 | 11 | 88 |

INPUTS I1, I2, ... In

D (arrow to table), $d_{i,j}$ (B)

P schedule $\begin{cases} P1, P2, P3, ... Pk & \text{<-- Configurations} \\ \phi 1, \phi 2, \phi 3, ... \phi k & \text{<-- Holding times} \end{cases}$ (C)

102 Configuration Pk

INPUTS   OUTPUTS

104

All required packet flows and number of packets in queues ated into packets, which are individually forwarded and switched toward their destinations. The main tasks of a router or switch are to receive a packet from the input port, find its destination port with regard to the routing table, transfer the packet to the output port via the switch fabric and finally transmit it on the output line. If a burst of packets destined to the same output port arrives, all packets cannot be transmitted on the fly and thus some of them need to be buffered. A critical aspect of the switch architecture is the placement of buffers.

NON-PREEMPTIVE SCHEDULING IN NETWORK ELEMENTS

CROSS-REFERENCE TO RELATED APPLICATIONS; PRIORITY CLAIM

This application claims benefit of Provisional Appln. 60/631,952, filed Nov. 29, 2004, the entire contents of which is hereby incorporated by reference as if fully set forth herein, under 35 U.S.C. §119(e).

FIELD OF THE INVENTION

The present invention generally relates to optical switches for data communications networks. The invention relates more specifically to techniques for non-preemptive scheduling of optical switches.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Internet is built around a large variety of transmission and switching systems and the information transfer is aggregated into packets, which are individually forwarded and switched toward their destinations. The main tasks of a router or switch are to receive a packet from the input port, find its destination port with regard to the routing table, transfer the packet to the output port via the switch fabric and finally transmit it on the output line. If a burst of packets destined to the same output port arrives, all packets cannot be transmitted on the fly and thus some of them need to be buffered. A critical aspect of the switch architecture is the placement of buffers.

In the Input Queuing (IQ) switch architecture packets arriving from the input lines are queued at the input ports. The packets are then extracted from the input queues to cross the switch fabric and to be forwarded to the output ports. The IQ architecture is used extensively in the design of high-speed routers. An optical switch operates on fixed-size cells and the time that elapses between two consecutive switching decisions is called a time slot. Each arriving packet is divided into cells at the input, and these cells are scheduled across the switch fabric separately. When the last cell arrives, the packet is reassembled and sent on the output link.

A major issue in the design of IQ switches is the scheduler that controls the access to the switching fabric in order to avoid contention at the input and the output ports. Every time slot, the scheduler determines the configuration of the switch, that is a matching between the inputs and the outputs, and each input queue is allowed to forward a cell to the output port it is matched to, if any.

Underlying the design of a wide range of switch architectures is the assumption that the switch configuration time is negligible compared to the cell transmission time. However, in optical switches the configuration time dominates over the cell transmission time.

In an optical switching fabric, input data modulates a tunable-wavelength laser that is directed toward a plurality of tuned-wavelength receivers. Switching one of a plurality of inputs to reach one of a plurality of outputs is achieved by tuning the lasers to one of a plurality of different wavelengths that matches a desired receiver. However, tuning any of the lasers requires a non-zero amount of time. In such a switch, reconfiguring the switching fabric makes it unavailable for a number of time slots equal to the configuration delay. Minimizing the effects of reconfiguration overhead on the switch performance requires specially designed schedulers that hold each configuration for several time slots, thus reducing the number of reconfigurations.

Therefore, in an Input-Queued (IQ) architecture, data packets are held in input queues while the lasers are tuned, then released to the lasers for transmission. Packets in the input queues are divided into cells of unit length. Each cell requires switching to one and only one output port associated with one receiver. When multiple cells need to be switched to the same output port, a first cell may be switched to the receiver associated with the output port, but transmitting one or more of the other cells is pre-empted until the first cell is transmitted and the receiver becomes available.

To achieve maximum efficiency, the scheduler must find a laser tuning arrangement that allows transmitting as many cells as possible to receivers and that minimizes the number of cells that must wait. The problem is complicated since in optical switches so-called configuration delay, which is the time required to reconfigure the switching fabric, is non-negligible with respect to the cell transmission time. In general, a scheduler selects a new matching of lasers to receivers, a non-zero configuration delay C occurs as the lasers are tuned, and the configuration is held for a pre-determined period of time as cells are transferred to the receivers.

Selecting which cells to transmit, using which laser and frequency, is performed by a scheduler in the optical switch. An arbitration sub-task performed by the scheduler, in which a cell at an input queue is selected for an available receiver associated with the correct output port, may be viewed as a bipartite matching. In bipartite scheduling, given a set of packets in the input queues, the makespan of the schedule is determined by a sum of the total configuration holding time and the configuration overhead C. Restated, a goal of efficient optical switch operation is to find a schedule of minimum makespan that forwards all packets to the output ports.

In pre-emptive scheduling, cells from one queue can be scheduled in different configurations, but scheduling complexity depends to an extent on the number of packets in the input queues. In non-preemptive bipartite scheduling, all cells from a single queue are scheduled in just one configuration; therefore, all cells in the queue can be transmitted serially using that configuration until the queue is empty.

A non-preemptive bipartite scheduler has a number of advantages over pre-emptive scheduling approaches. First, the complexity of the scheduler does not depend on the number of packets in the input queues, but only on switch size. The number of re-configurations of the switching fabric is minimized. High-speed operation is possible, and the scheduler can efficiently handle variable-size packets without maintaining packet reassembly buffers.

While non-preemptive bipartite scheduling is theoretically superior for the reasons just given, prior approaches have not adequately solved the Non-Preemptive Bipartite Scheduling (NPBS) problem. Relevant literature in the field, which is further discussed in the provisional application from which priority is claimed herein, includes:

N. McKeown, "The iSLIP Scheduling Algorithm for Input-Queued Switches," IEEE/ACM Transactions on Networking, vol. 7, no. 2, pp. 188-201, April 1999. The Non-Preemptive Bipartite Scheduling (NPBS) problem was studied in the context of matrix decomposition for zero configuration delay.

C. C. Ribeiro, M. Minoux and M. C. Penna, "An Optimal Column-Generation-with-Ranking Algorithm for Very Large Scale Set Partitioning Problems in Traffic Assignment,"

European Journal of Operational Research, Vol. 41, pp. 232-239, 1989, proposes solving the NPBS problem optimally using a branch and bound procedure.

M. Prais and C. C. Ribeiro, "Reactive GRASP: An Application to a Matrix Decomposition Problem in TDMA Traffic Assignment," INFORMS Journal on Computing, Vol. 12, pp. 164-176, 2000, propose a heuristic called Reactive Greedy Randomized Adaptive Search Procedure (GRASP).

V. Vokkarane et al., "Segmentation-Based Non-Preemptive Scheduling Algorithms for Optical Burst-Switched Networks," an online publication available at the time of this writing in the file WOBS03_Sch.pdf of the folder /~jjue/publications/ of the domain utdallas.edu on the World Wide Web, states that data channel scheduling in OBS networks is the process of assigning an outgoing data channel for the unscheduled arriving burst. Data channel scheduling in OBS networks is different from traditional IP scheduling. In IP, each core node stores the packets in electronic buffers and schedules them on the desired output port. In OBS, once a burst arrives at a node, it must be sent to the next node without storing the burst in electronic buffers. The authors assume that each OBS node supports full-optical wavelength conversion.

Preemptive batch scheduling is considered in Shlomi Dolev and Alexander Kesselman, "Bounded Latency Scheduling Scheme for ATM Cells," Proceedings of The 4th IEEE Symposium on Computers and Communications (ISCC'99), pp. 273-277.

F. Afrati, T. Aslanidis, E. Bampis, and I. Milis, "Scheduling in Switching Networks with Set-up Delays," ALGOTEL'2002, Muze, France, May 2002.

M. S. Borella and B. Mukherjee, "Efficient Scheduling of Nonuniform Packet Traffic in a WDM/TDM Local Ligthwave Network with Arbitrary Transceiver Tuning Latencies," IEEE J. on Selected Areas on Communication, Vol. 14, pp. 923-934, June 1996.

G. Bongiovanni, D. Coppersmith, and C. K. Wong, "An Optimal Time Slot Assignment for a SS/TDMA System with Variable Number of Transponders," IEEE Transactions on Communication, Vol. 29, pp. 721-726, 1981.

S. Chalasani and A. Varma, "Efficient Time-slot Assignment Algorithms for SS/TDMA Systems with Variable Bandwidth Beams," IEEE Trans. Commun., Vol. 42, no. 3, pp. 1359-1370, March 1994.

M. Chen and T. S. Yum, "A Conflict-free Protocol for Optical WDMA Networks," in Proc. GLOBECOM'91, pp. 1276-1281, 1991.

P. Crescenzi, X. Deng, C. Papadimitriou, "On Approximating a Scheduling Problem," Journal of Combinatorial Optimization, Vol. 5, pp. 287-297, 2001.

S. Dolev and A. Kesselman, "Bounded Latency Scheduling Scheme for ATM Cells," Journal of Computer Networks, Vol. 32(3), pp 325-331, March 2000.

S. Even, A. Itai, and A. Shamir, "On the complexity of timetable and multicommodity ow problems," SIAM J. Computing, Vol. 5, pp. 691-703, 1976.

A. Ganz and Y. Gao, "A Time-wavelength Assignment Algorithm for a WDM Star Network," in Proc. INFOCOM'92, pp. 2144-2150, 1992.

M. R. Garey and D. S. Johnson, "Computers and Intractability: A Guide to the Theory of NP Completeness," W. H. Freeman, San Francisco, 1979.

T. Gonzalez and S. Sahni, "Open Shop Scheduling to Minimize Finish Time," Journal of the ACM, Vol. 23, pp. 665-679, 1976.

S. Gopal and C. K. Wong, "Minimizing the Number of Switchings in a SS/TDMA System," IEEE Trans. Commun., Vol. COM-33, pp. 497-501, June 1985.

T. Inukai, "An Efficient SS/TDMA Time Slot Assignment Algorithm," IEEE Transactions on Communication, Vol. 27, pp. 1449-1455, 1979.

R. Jain, K. Somalwar, J. Werth, and J. C. Browne, "Scheduling Parallel I/O Operations in Multiple-Bus Systems," J. Parallel and Distributed Computing, special issue on Scheduling and Load Balancing, December 1992.

R. Jain, K. Somalwar, J. Werth, and J. C. Browne, "Heuristics for Scheduling I/O Operations," IEEE Trans. on Parallel and Distributed Systems, Vol 8(3), 1997.

X. Li and M. Hamdi, "$\lambda$-ADJUST Algorithm for Optical Switches with Reconfiguration Delay," in Proc. of International Conference on Communications (ICC'03), 2003.

M. A. Marsan, A. Bianco, E. Leonardi, F. Neri and A. Nucci, "Efficient Multi-Hop Scheduling Algorithms for All Optical WDM Broadcast-and-Select Networks with Arbitrary Transceivers Tuning Latencies," in Proc. of IEEE GLOBECOM'98, Sydney, Australia, November 1998.

M. Prais and C. C. Ribeiro, "Reactive GRASP: An Application to a Matrix Decomposition Problem in TDMA Traffic Assignment," INFORMS Journal on Computing, Vol. 12, pp. 164-176, 2000.

F. Rendl, "On the complexity of decomposing matrices arising in satellite communication," Operations Research Letters, Vol. 4, pp. 5-8, 1985.

C. C. Ribeiro, M. Minoux and M. C. Penna, "An Optimal Column-Generation-with-Ranking Algorithm for Very Large Scale Set Partitioning Problems in Traffic Assignment," European Journal of Operational Research, Vol. 41, pp. 232-239, 1989.

G. N. Rouskas and M. H. Ammar, "Analysis and Optimization of Transmission Schedules for Single-hop WDM Networks," IEEE/ACM Transaction on Networking, Vol. 3, pp. 211-221, April 1995.

G. N. Rouskas, V. Sivaraman, "Packet Scheduling in Broadcast WDM Networks with Arbitrary Transceivers Tuning Latencies," IEEE/ACM Transactions on Networking, Vol. 5(3), pp. 359-370, June 1997.

B. Towles and W. J. Dally, "Guaranteed Scheduling for Switches with Configuration Overhead," in Proc. Twenty-First Annual Joint Conference of the IEEE Computer and Communications Societies INFOCOM'02, pp. 342-351, June 2002.

T. Weller, B. Hajek, "Scheduling Nonuniform Traffic in a Packet-switching System with Small Propagation Delay," IEEE/ACM Transactions on Networking, Vol. 5(6), pp. 813-823, December 1997.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
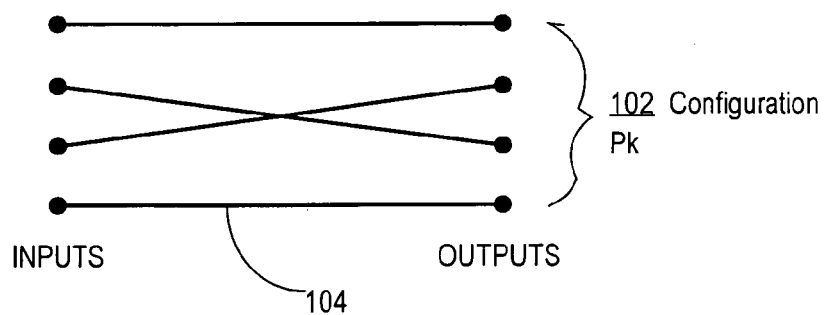
FIG. 1A is a block diagram showing an example traffic matrix.
FIG. 1B illustrates elements of a schedule.
FIG. 1C is a schematic diagram of an optical crosspoint switch.
FIG. 1D is a flow diagram that illustrates a high level overview of one embodiment of a method for non-preemptive scheduling in an optical switch.
FIG. 1E illustrates an embodiment of a diagram of edges, weights and matchings.

A method and apparatus for non-preemptive scheduling of optical switches is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Time Slot Assignment Problem
   2.2 Modeling the Problems
   2.3 Differences Between PBS and NPBS Problems
3.0 Non-preemptive Scheduling of Optical Switches
   3.1 Off-line and On-line Scheduling Approaches
   3.2 Extension to Non-Bipartite Scheduling
   3.3 Concept Review
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method, comprising receiving a set of packets from a network element; scheduling the packets for processing in the network element by applying a greedy algorithm to the set of packets. In one feature of this aspect, the network element is an optical switch.

In another aspect, the invention provides a method providing non-preemptive scheduling in a network element, comprising the computer-implemented steps of creating and storing a graph, wherein edges represent cells of an optical crossbar switch directed from inputs to outputs thereof, wherein each of the edges has an associated weight value, wherein weight values represent occupancy of a corresponding input queue of the optical switch; creating and storing a matching that can potentially include a plurality of edges; adding, to the matching, all edges that are compatible with the matching, in order of decreasing weight; marking in the graph as covered all the edges that have been added to the matching; and repeating the preceding three steps until all the edges in the graph are covered.

In one feature of this aspect, the method further comprises selecting a maximum of the weights of all edges in a matching as a holding time value for the matching. In another feature, the method further comprises creating and storing a schedule for the optical crossbar switch, wherein the schedule comprises all the matchings and associated holding time values.

In still another feature, the method features accumulating a plurality of data packets into a first batch among a plurality of traffic batches; creating and storing a schedule for the first batch using the first five steps hereof, wherein a maximum of the weights of all edges in a matching is selected as a holding time value for the matching, wherein the schedule comprises all the matchings and associated holding time values; transmitting the plurality of data packets of the first batch from the inputs to the outputs according to the schedule; and repeating the preceding three steps for all other traffic batches.

In a related feature, the method further comprises marking all data packets in one or more input queues of the optical switch as a first traffic batch; creating and storing a schedule for the first traffic batch using the first five steps hereof, wherein a maximum of the weights of all edges in a matching is selected as a holding time value for the matching, wherein the schedule comprises all the matchings and associated holding time values; transferring the data packets from the input queues to the outputs according to the schedule; repeating the preceding three steps for all other traffic batches.

In another feature, all unmarked packets that are in the same queue as used for a particular matching are added to a particular edge of the matching such that a total first weight of the particular edge is less than a maximum edge in the matching.

According to another aspect, a method provides non-preemptive scheduling in a network element, comprising the computer-implemented steps of creating and storing a traffic demand matrix, wherein rows of the matrix represent inputs to an optical crossbar switch, columns of the matrix represent outputs, and values in the matrix represent quantities of cells directed from associated inputs to associated outputs; creating and storing a graph based on the traffic demand matrix, wherein edges represent cells of an optical crossbar switch directed from inputs to outputs thereof, wherein each of the edges has an associated weight value, wherein weight values represent occupancy of a corresponding input queue of the optical switch; creating and storing a first matching that can potentially include a plurality of edges; identifying a heaviest uncovered edge in the graph and placing the heaviest uncovered edge in the first matching; creating one or more other matchings; adding, to a particular one of the other matchings, all other edges that are compatible with that particular matching, in order of decreasing weight; marking in the graph as covered all the edges that have been added to the matching; and repeating the preceding three steps until all the edges in the graph are covered; selecting a maximum of the weights of all edges in a matching as a holding time value for the matching; creating and storing a schedule for the optical crossbar switch, wherein the schedule comprises all the matchings and associated holding time values.

In one feature of this aspect, the method further comprises accumulating a plurality of data packets into a first batch among a plurality of traffic batches; creating and storing a schedule for the first batch using the first ten steps hereof; transmitting the plurality of data packets of the first batch from the inputs to the outputs according to the schedule; repeating the preceding three steps for all other traffic batches.

In another feature, the method further comprises marking all data packets in one or more input queues of the optical switch as a first traffic batch; creating and storing a schedule for the first traffic batch using the first ten steps hereof, wherein a maximum of the weights of all edges in a matching is selected as a holding time value for the matching, wherein the schedule comprises all the matchings and associated holding time values; transferring the data packets from the input queues to the outputs according to the schedule; repeating the preceding three steps for all other traffic batches.

In another feature, all unmarked packets that are in the same queue as used for a particular matching are added to a particular edge of the matching such that a total first weight of the particular edge is less than a maximum edge in the matching.

In other aspects, the invention encompasses a computer apparatus and a computer-readable medium configured to carry out the foregoing steps.

2.0 Structural and Functional Overview

According to an embodiment, a graph based on a data traffic matrix represents the occupancy of a set of input queues to an optical crosspoint packet data switch. Edges in the graph are assigned to a matching in order of decreasing weight, provided that the edges do not conflict with other edges previously placed in the matching. If a conflict is found for a particular edge, a new matching is created and the conflicting edge is placed in the new matching. The process iterates until all edges are covered, resulting in creating a collection of matchings. The collection of matchings is transformed into a schedule such that each matching defines a switch configuration and the weight of the heaviest edge determines its holding time. The length of the obtained schedule equals to the total cost of the collection.

The process is termed "greedy" because edges are covered from weightiest to lightest. Approaches are described for offline processing, in which packets do not arrive in the queues as the process proceeds, and online processing in which packets constantly arrive. The NPBS problem has been found to be NP-hard for any value of the configuration delay and approximation within a ratio smaller than 7/6 is NP-hard as well. For the offline version of the NPBS problem, the greedy approach herein achieves an approximation factor of 2 for arbitrary configuration delay. In the online version of the NPBS problem, the switch gathers the incoming traffic periodically and then schedules the accumulated batches using the offline greedy approach. Further, a practical scheduling algorithm that provides strict delay guarantees is described.

The proposed algorithm is suitable for batch scheduling in any input or combined input and output queued switch, where batch is a set of marked packets in the input queues that have to be scheduled to minimize the delay. The complexity of the algorithm is almost linear on the switch size (the number of input/output ports) and does not depend on the number of packets to be scheduled. Since non-preemptive scheduling is used, there is no need to keep packet reassembly buffers at output ports when packets have variable size (e.g. IP packets). The algorithm is very simple and amenable to efficient hardware implementation. One key technical benefit of certain embodiments is guaranteeing bounded delay for all packets.

2.1 Time Slot Assignment Problem

FIG. 1A is a block diagram showing an example traffic matrix. FIG. 1B illustrates elements of a schedule. FIG. 1C is a schematic diagram of an optical crosspoint switch.

The Time Slot Assignment (TSA) problem is to find a conflict-free schedule of cells so as to minimize its makespan. As foundation for the approaches described herein, the TSA can be defined more formally. Referring first to FIG. 1A, traffic demand is specified by a matrix D. An element $d_{i,j}$ of D represents the number of cells to be transferred from one of the inputs $i_{1,2,\ldots,n}$ to one of the outputs $j_{1,2,\ldots,n}$. Thus, values in D may represent the occupancy of input queues of an optical switch; example cell values are shown in FIG. 1A, and an actual implementation may use any suitable or actual values.

Referring to FIG. 1B, a schedule P is formed by a sequence of k configurations (permutation matrices) $P_1$, $P_2$, $P_k$ and corresponding holding times $\Phi_1$, $\Phi_2$, $\Phi_k$. As seen in FIG. 1C, in any configuration 102, each input is connected with at most one output, and each output is connected with at most one input. For an element 104 of a configuration 102, also denoted as an element $p^q_{i,j}$ of $P_q$, if $p^q_{i,j}=1$ then in the configuration $P_q$, input i is connected to output j.

A matrix D is said to be covered by P if all the demands are satisfied, i.e. $\forall i,j, \Sigma^k_{q=1} \phi_q \cdot p^q_{i,j} \geq d_{i,j}$. The schedule is called non-preemptive if each input is connected at most once to each output, i.e. $\forall i,j, \Sigma^k_{q=1} p^q_{i,j} \leq 1$. Otherwise, the schedule is said to be preemptive. The term C shall denote the configuration delay, expressed in units of the cell transmission time. The duration of P is the total holding time of all the configurations, that is $\Sigma^k_{q=1} \phi_q$. The configuration overhead of P is kC. The length of P is the sum of the duration and the configuration overhead, that is $\Sigma^k_{q=1} \phi_q + kC$. Given a traffic demand matrix and the configuration delay, the goal is to find a schedule of minimum length.

The TSA problem can be reduced to an equivalent bipartite graph matching problem in the following way. A bipartite graph $G^D$ is constructed and corresponds to the traffic demand matrix D. The nodes of the graph are the input and the output ports of the switch. For each $d_{i,j}>0$, there is an edge $e=(i,j)$ of weight $w(e)=d_{i,j}$ representing the traffic demand from input i to output j. If the schedule is preemptive, an edge can be sub-divided into a number of parallel edges adding up to the original weight. The cost of a matching is the weight of the heaviest edge plus the configuration delay. The aim is to find a collection of matchings of minimum cost in which each edge takes part in exactly one of the matchings.

2.2 Modeling the Problems

The problems addressed herein may be based upon the following conceptual model. An optical packet switch has a crosspoint matrix of N×N with Virtual Output Queuing (VOQ), where each input maintains a separate queue per each output. Packets, of different size, arrive at input ports, and each packet is labeled with the output port on which it has to leave the switch. Each packet is divided into cells of unit length. Time is slotted and during a time slot exactly one cell can arrive at an input line and exactly one cell can be sent on an output line.

If the switch has a "speedup" of S, then up to S cells can be removed from any input and up to S cells can be added to any output during a time slot. Changing from one switch configuration to another requires C/S time slots; the value C/S is assumed to be an integer. In the offline setting, S=1 and the scheduled cells are immediately sent on the output lines. In the online setting, S>1 and cells are buffered at the inputs before they are scheduled and at the outputs before they are transmitted on the output lines.

The offline version of the NPBS problem may be defined as follows: Given a traffic demand matrix D and the configuration delay C, find a non-preemptive schedule of minimum length that covers D. In the online setting, the switch gathers the incoming traffic periodically and then schedules the accumulated batches. In an embodiment, the scheduler performs pipelined batch scheduling in three phases. The length of each phase is a predefined system constant T. The smaller the value of T, the smaller the delay guaranteed by the processes herein. However, the value of T must be large enough to accommodate bursts.

The incoming traffic is gathered during the accumulating phase and stored in the traffic demand matrix D. The accumulated traffic is termed a batch. In the scheduling phase, the accumulated batch is scheduled and the cells are stored in the output buffers. Finally, during the transmission phase the batch is transmitted from the output buffers onto the output lines.

A traffic is said to be admissible if any batch can be scheduled in a non-preemptive fashion during T time slots without a speedup (i.e., with S=1). A scheduling algorithm is said to be stable, if for any admissible traffic it provides a bound of 3T on the worst-case delay of a packet.

In the remainder of this description, the following notation is used: N is number of switch ports; D is a non-negative integer N×N traffic demand matrix and $d_{i,j}$ represents the number of cells waiting at input i that must be transferred to output j; P is a schedule; k is the number of switch configurations in P; $P_q$ is the q-th switch configuration (permutation matrix) in P and $p^q_{i,j}=1$ if the input i is connected to output j in this configuration; $\Phi_q$ is the holding interval of the q-th configuration in P; C is the switch configuration delay in time slots; T is the batch period in time slots; S is internal speedup of the switch.

2.3 Differences Between PBS and NPBS Problems

The scheduling task is the NPBS problem. This section describes certain differences between the PBS and the NPBS problems. In a non-preemptive schedule, each configuration is held for the maximal time required by the covered elements, i.e. $\Phi_q=\max\{d_{i,j}|\ p^q_{i,j}=1\}$. That is contrary to a preemptive schedule, where the holding time of a configuration is typically determined by the minimal time required by the covered elements. The present approach attempts to avoid empty time slots in order to minimize the duration of the schedule.

The maximal number of cells that must be transferred from an input or to an output, that is $M(D)=\max(\max j(\text{sum }\{i=1\}^N d_{i,j}), \max i(\text{sum }\{j=1\}^N d_{i,j}))$ is a lower bound on the duration of any schedule. In fact, one can always construct a preemptive schedule with the duration of M(D). However, the minimum duration of a non-preemptive schedule may be greater than M(D). Consider the following traffic demand matrix:

| 100 | 0  | 0  |
|-----|----|----|
| 0   | 0  | 0  |
| 0   | 50 | 50 |

Although M(D)=100, the duration of any non-preemptive schedule is at least 150 since d{1,1} cannot be scheduled with both of d{3,2} and d{3,3}.

The optimal solution to the NPBS problem depends on the actual value of C. If C is small, then the duration of a schedule dominates over the configuration overhead. Conversely, if C is large, minimizing the number of reconfigurations becomes critical. For example, consider the following traffic demand matrix:

| 100 | 0 | 0   |
|-----|---|-----|
| 1   | 0 | 1   |
| 0   | 0 | 100 |

If C = 10, the optimal schedule consists of three configurations:

| 1 | 0 | 0 |
|---|---|---|
| 0 | 0 | 0 |
| 0 | 0 | 1 |
| 0 | 0 | 0 |
| 1 | 0 | 0 |
| 0 | 0 | 0 |
| 0 | 0 | 0 |
| 0 | 0 | 1 |
| 0 | 0 | 0 | with holding times $\Phi 1=100$ and $\Phi 2=\Phi 3=1$ and its length is 100+1+1+(3*10)=132. In case C=200, the optimal schedule consists of only two configurations:

| 1 | 0 | 0 |
|---|---|---|
| 0 | 0 | 1 |
| 0 | 0 | 0 |
| 0 | 0 | 0 |
| 1 | 0 | 0 |
| 0 | 0 | 1 | with holding times $\Phi 1=\Phi 2=100$ and its length is 100+100+(2*200)=600.

In the description of the data processing methods herein that solve the NPBS problem, the formulation of the problem in terms of bipartite graph matching is used. In one approach, a main loop assigns each positive entry of the original traffic demand matrix to exactly one of the matchings. When a new matching is initialized, the process first finds the heaviest uncovered edge $e_m$. The weight of $e_m$ determines the holding time of the configuration. The approach then adds edges that remained uncovered so far, in the order of non-increasing weight, if they do not conflict with the current matching.

The running time of the greedy algorithm herein is $O(N^2 \log N)$. Since the holding time of a configuration may be greater than the weight of some edges in the corresponding matching, the schedule may contain empty slots. To minimize the number of empty slots, the approach herein attempts to group entries whose values are close to one another into the same matching. Further, the number of configurations is minimized because in each iteration of the main loop, the process computes a maximal matching. As a result, the approach herein finds a good trade-off between minimizing the duration against minimizing the configuration overhead of a schedule.

3.0 Methods of Non-Preemptive Scheduling in Network Elements 3.1 Off-Line and On-Line Scheduling Approaches According to an embodiment, a collection of matchings is transformed into a schedule such that each matching defines a switch configuration and the weight of the heaviest edge determines its holding time. The length of the obtained schedule equals to the total cost of the collection.

Figure 1D:
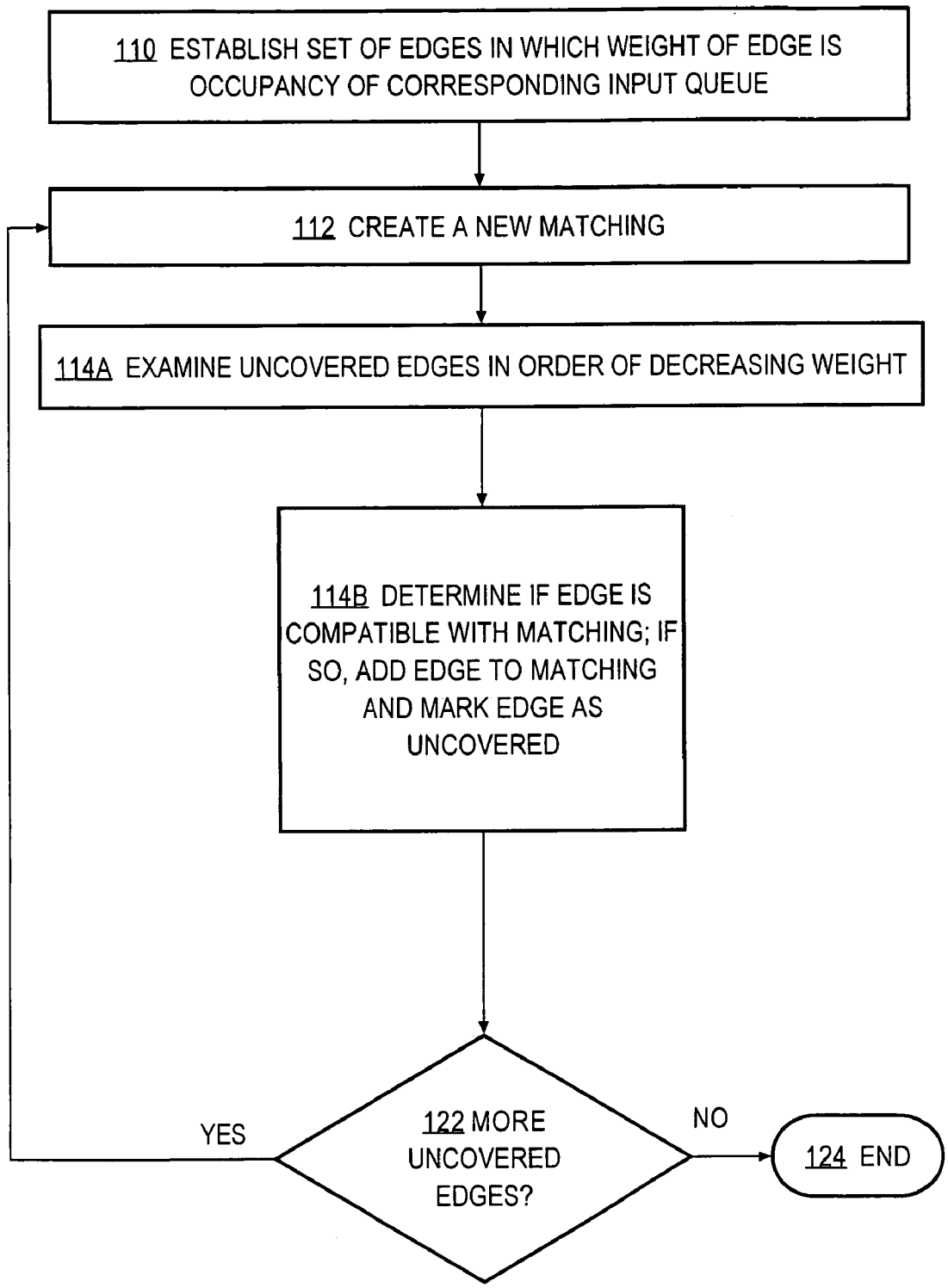
Figure 1E:
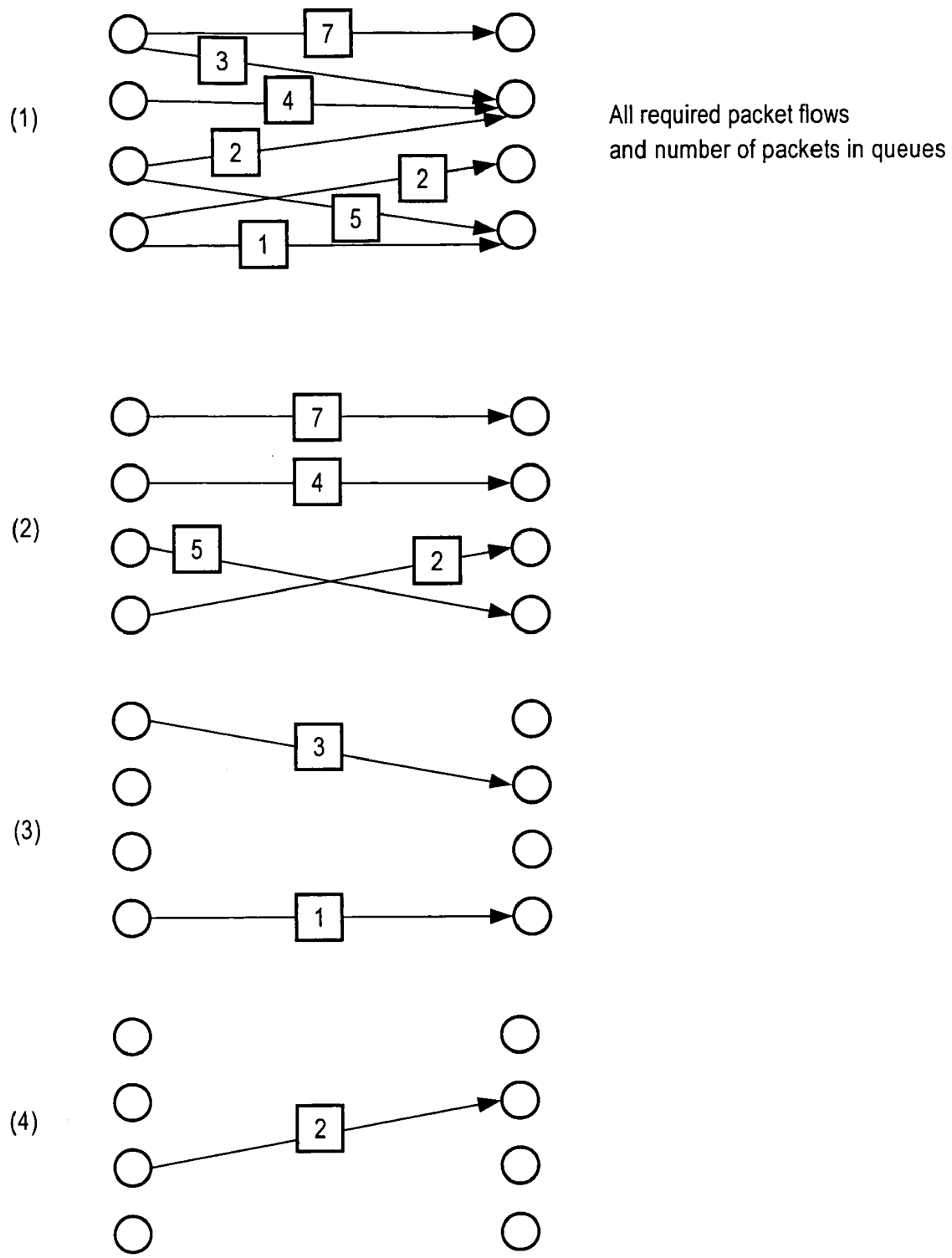

FIG. 1D is a flow diagram that illustrates a high level overview of one embodiment of a method for non-preemptive scheduling in an optical switch. FIG. 1E is a diagram of edges, weights and matchings that is used herein for illustrating operation of the process of FIG. 1D. Referring first to FIG. 1D, in step 110, a set of edges is established, in which the weight of an edge represents the number of packets of a corresponding packet queue—that is, the occupancy of the corresponding queue. For example, in FIG. 1E, arrows represent edges of a graph from inputs to outputs, and numbered boxes represent weights.

In step 112, a new matching is created. For example, in FIG. 1E(1), a first matching is shown, and second and third matchings are shown in FIG. 1E(2), FIG. 1E(3). In step 114A, all uncovered edges of the set of edges are examined, in order of decreasing weight. Thus, the succeeding step 114B is performed for all edges in the set that are then currently uncovered, to determine if the edges can be placed in the current matching. If a particular uncovered edge is compatible with the matching, as tested in step 114B, then that edge is added to the matching. The edge is then marked as covered, which removes the edge from further consideration. If uncovered edges remain in the set of edges, as tested at step 122, then control returns to step 112 in which a new matching is created to accommodate the uncovered edges that were incompatible with the prior matching.

As an example, in FIG. 1E, the edges with weights 7, 5, 4, and 2 (first edge) can be placed in the first matching of FIG. 1E(2). However, the edge of weight 3 is incompatible with the first matching. Therefore, the edges with weights 7, 5, 4, and 2 are marked as covered in the graph of FIG. 1E(1), and in a subsequent iteration the second matching of FIG. 1E(3) is created and the edge of weight 3 is placed there. The edge of weight 1 also is placed in the same matching, but the second edge of weight 2 is incompatible, so it is placed in a third matching of FIG. 1E(4).

Figure 2A:
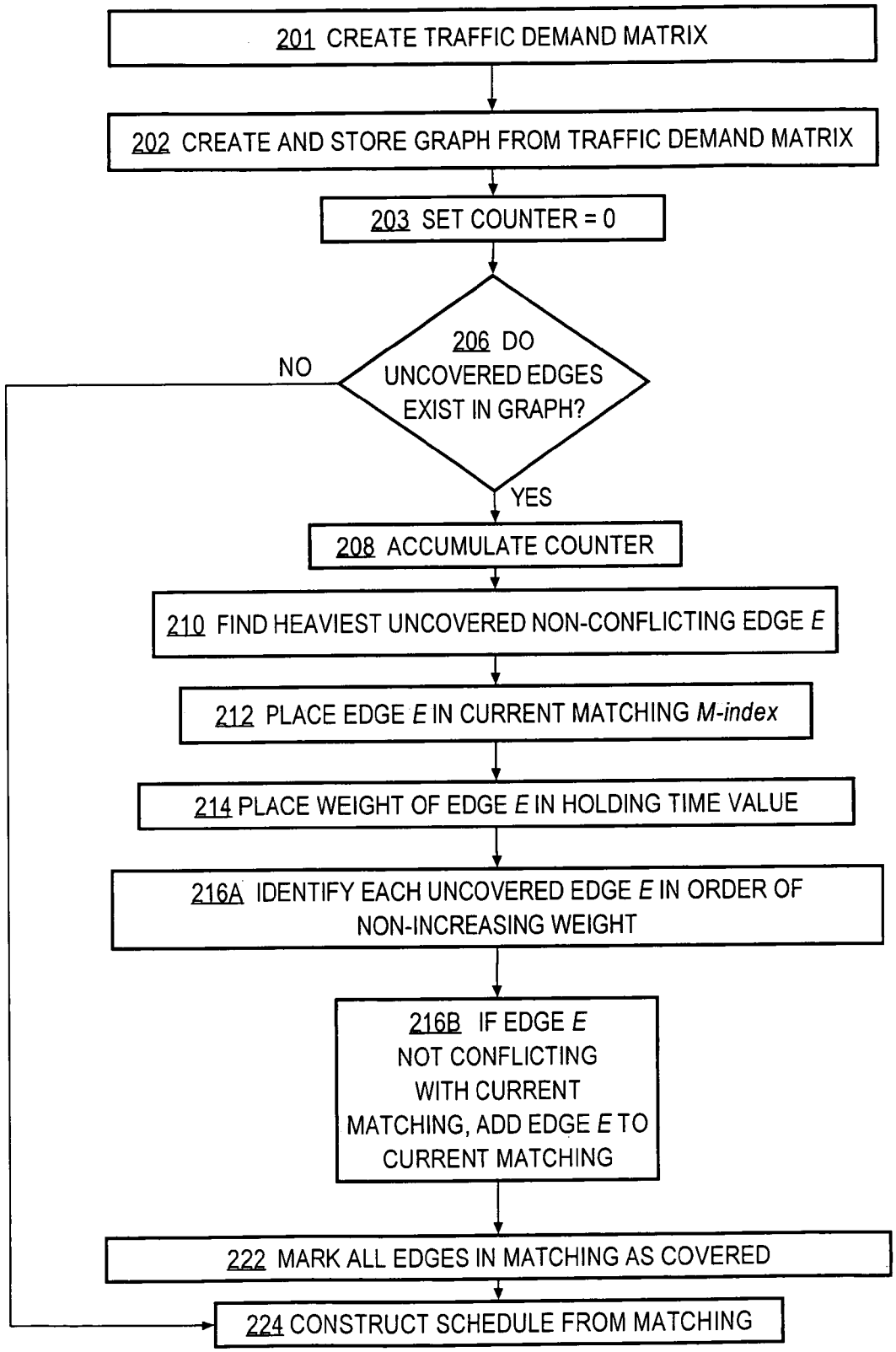
FIG. 2A is a flow diagram of another embodiment of a method for non-preemptive scheduling in an optical switch, using a "greedy" approach.
Figure 3A:
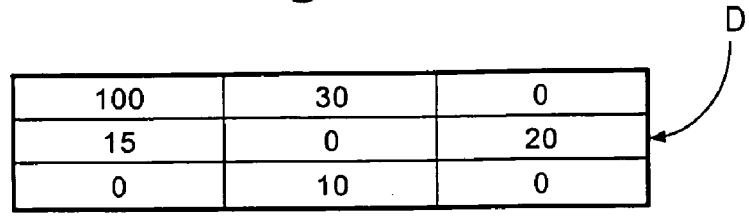
FIG. 3A is a block diagram of an example traffic matrix.
Figure 3B:
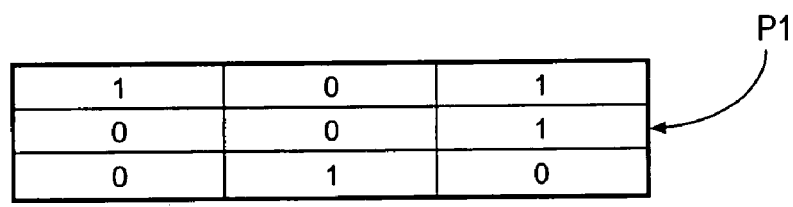
FIG. 3B is a block diagram of example configuration matrices based on FIG. 3A.
Figure 3B:
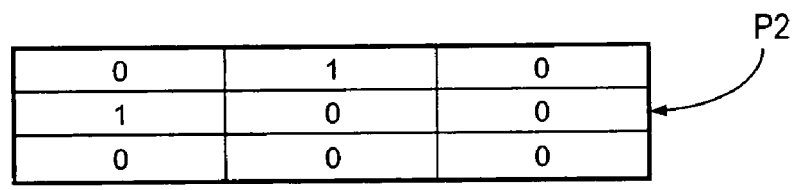

FIG. 2A is a flow diagram of another embodiment of a method for non-preemptive scheduling in an optical switch, using a "greedy" approach. FIG. 3A is a block diagram of an example traffic matrix, FIG. 3B is a block diagram of example configuration matrices based on FIG. 3A, which are now described for purposes of illustrating an example use of the method of FIG. 2A. Steps of both FIG. 1D and FIG. 2A may be implemented in a distributed manner.

Referring first to FIG. 2A, in step 201, a traffic demand matrix is created. In one embodiment, the traffic demand matrix is created based upon the occupancy of the input queues of an optical switch. FIG. 3A is a block diagram of an example traffic matrix D for an optical switch having three inputs and three outputs and in which occupancy of the input queues ranges from 0 to 100 cells. In step 202, a graph is created and stored based on the traffic demand matrix. The graph may have the form described above. In step 203 a counter is set to zero; the counter serves as an index in succeeding steps to indicate the current matching.

In step 206, the process tests whether uncovered edges exist in the graph. If so, then the counter value is accumulated at step 208, and a new matching is created, indexed by the counter value. At step 210, the heaviest uncovered edge E that does not conflict with the current matching is found, and at step 212 the edge is placed in the current matching, denoted $M_{counter}$. The weight of the edge is added to a total holding time value for configurations associated with the current matching.

For the example traffic matrix D of FIG. 3A, initially, the heaviest edge (1,1) of weight 100 is added to the first matching $M_1$.

A loop is then performed to add all other non-conflicting edges to the current matching. At step 216A, each uncovered edge E of the graph is identified in order of decreasing weight. At step 216B, a test is performed to determine whether the edge is not conflicting with the current matching. If there is no conflict, then the edge is added to the current matching. If edge conflicts, then all edges in the current matching are marked in the graph as covered, to prevent further consideration of those edges.

Continuing with the example of FIG. 3A, the second heaviest edge (1,2) of weight 30 is not compatible with matching $M_1$, because including both (1,1) and (1,2) in the same matching would require mapping the first input to both the first output and the second output. Therefore, edge (2,3) of weight 20 is added to the first matching. Since the fourth heaviest edge (2,1) of weight 15 conflicts with matching $M_1$, the construction of matching $M_1$ is concluded by including edge (3,2) of weight 10. The resulting configuration P1 is shown in FIG. 3B. The process then creates a second matching $M_2$ containing the remaining edges (1,2) of weight 30 and (2,1) of weight 15.

In step 224, when all matchings are created and all edges have been covered, a schedule is constructed from the matchings. For FIG. 3A, the obtained schedule as shown in FIG. 3B consists of two configurations P1, P2 with holding times $\Phi1=100$ and $\Phi2=30$; the length of the schedule is 130+2C.

Figure 2B:
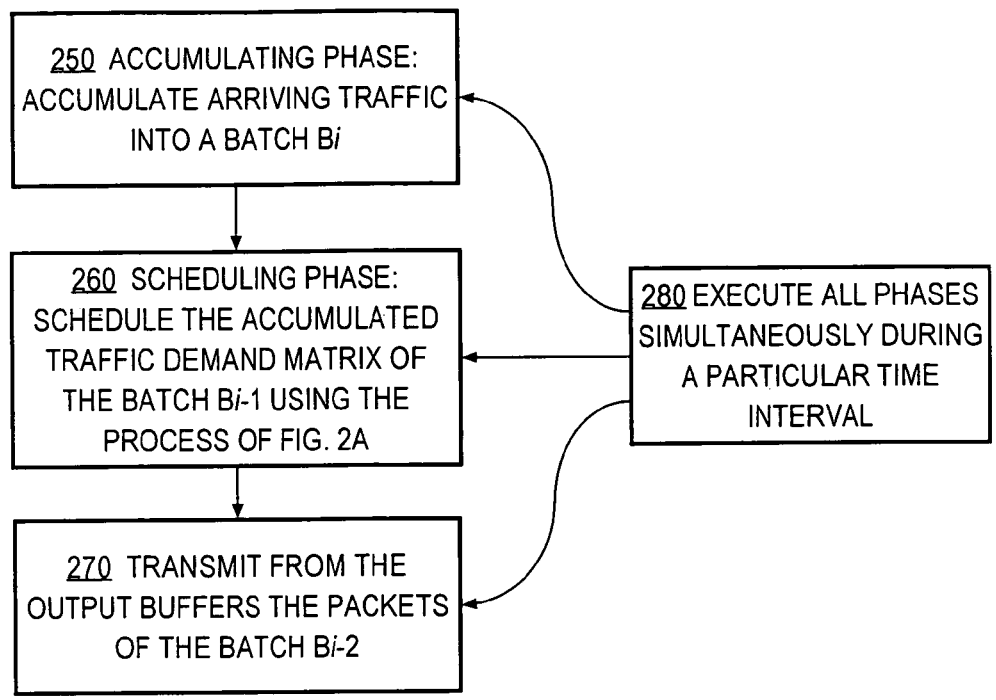
FIG. 2B is a flow diagram of an online embodiment of a method for non-preemptive scheduling in an optical switch.

FIG. 2B is a flow diagram of an online embodiment of a method for non-preemptive scheduling in an optical switch. In general, FIG. 2B embodies a greedy batch algorithm for an online version of the NPBS problem. In an accumulating phase at step 250, incoming traffic is periodically gathered and then scheduled as a batch at step 260 using the greedy algorithm of FIG. 2A. The batch is then transmitted at step 270. Thus, FIG. 2B presents a pipelined scheduling approach in three phases: an accumulating phase, a scheduling phase and a transmission phase. As indicated in step 280, batches may be concurrently gathered, scheduled and transmitted. The time interval over which concurrent operations occur may vary depending on the size of the batch that is being scheduled.

The length of each phase is a predefined system constant T. At any time slot, there are at most three active batches in the system, i.e. one batch per phase. If all traffic accumulated in the accumulating phase traverses the switch during the scheduling phase and is transmitted during the transmission phase then no packet stays in the switch for more than 3T time slots.

Section IV, Performance Analysis, of the provisional patent application from which priority is claimed herein demonstrates that the greedy batch algorithm guarantees this property for any admissible traffic, and provides analysis of the performance of all approaches herein.

Figure 4:
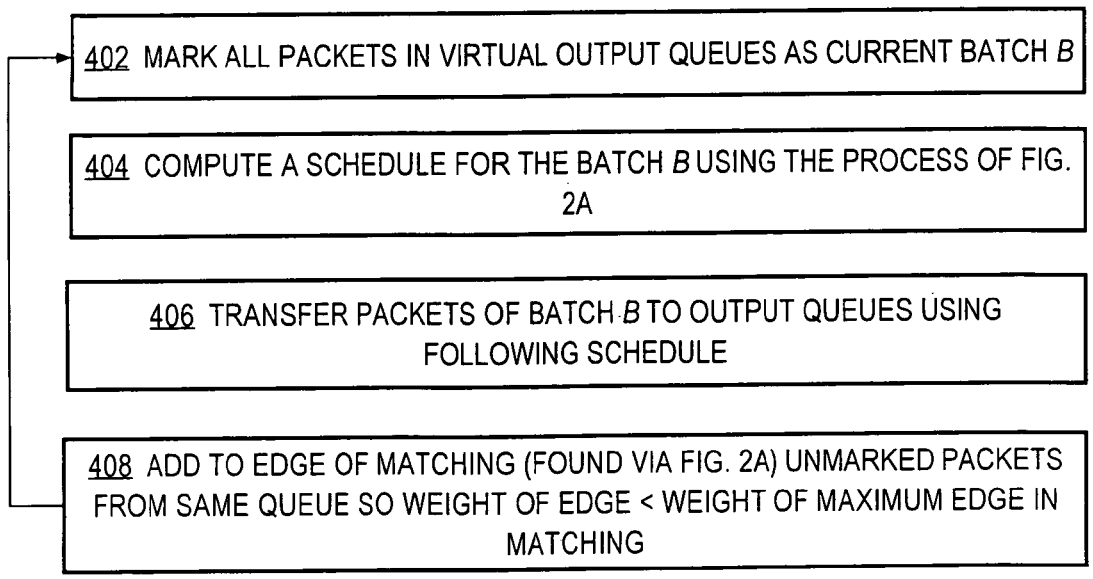
FIG. 4 is a flow diagram of a scheduling process.

FIG. 4 is a flow diagram of a scheduling process. In certain embodiments, the process of FIG. 4 embodies a practical scheduling algorithm that could be applied to any input-queued switch. The proposed algorithm supports switches with any configuration delay, packet size, and speedup.

The practical algorithm uses batches of variable size and does not make any assumptions regarding the nature of the arriving traffic; therefore, the process of FIG. 4 does not need the constant T. In addition, FIG. 4 improves the throughput of the switch by adding packets from the next batch while scheduling the current batch if it does not increase the holding time of the configuration. The practical algorithm also guarantees bounded delay for all packets and avoids starvation. Once a packet is marked as a part of the current batch, it will be eventually scheduled by the greedy algorithm.

Referring now to FIG. 4, in step 402, the process marks all the packets in the virtual output queues as the current batch B. In step 404, the greedy algorithm of FIG. 2A is applied to compute a schedule of the current batch. In step 406, the process transfers the packets of the current batch B to the output queues according to this schedule. In step 408, the process adds to each edge of the matching computed by the greedy algorithm packets from the same queue that are unmarked (do not belong to B) so that the weight of this edge does not exceed the weight of the maximum edge in this matching. This approach minimizes the number of empty slots using packets from the next batch and does not affect the makespan of the schedule. Control then returns to step 402.

3.2 Extension to Non-Bipartite Scheduling

In one embodiment, the approaches herein may be applied to the case of non-bipartite scheduling. For example, a modified approach may be used in a system in which processors exchange data and each processor can perform either a send operation or a receive operation at a time.

Such an approach addresses a problem denoted herein as the Non-Preemptive General Scheduling (NPGS) Problem. As defined herein, given a weighted graph G=(V,E) in which each directed edge e=(i,j) in E has an associated weight w(e) representing the number of cells to be transmitted from processor i to processor j and the configuration delay C of the system, find a collection of matchings $M_1 \ldots M_k$ such that each edge belongs to exactly one of the matchings and the cost is $\Sigma^k_{q=1} w(M_q)+kC$ is minimized, where $w(M_q)$ is the weight of the heaviest edge in $M_q$.

The approximation factor achieved by the greedy algorithm for the NPGS problem is at most 2 for arbitrary configuration delay.

3.3 Concept Review

With the fast development of the Internet, optical switching technologies are becoming an alternative to electronic switches due to their capacity and scalability. However, optical switches have a large configuration delay, which complicates the scheduling problem. In order to design efficient scheduling algorithms, one has to consider this overhead. On the other hand, only low complexity scheduling algorithms are amenable to implementation in high speeds.

Embodiments provide a scheduler that addresses the NPBS problem, where each input queue is connected to each output port in at most one configuration. In non-preemptive scheduling, the complexity of the scheduler does not depend on the number of packets in the input queues, which makes it attractive for batch scheduling where a large number of packets is accumulated within a batch.

A greedy algorithm as provided achieves an approximation factor of 2 for the offline version of the NPBS problem and is also applied to online batch scheduling. The running time of the greedy algorithm is $O(N^2 \log N)$ and it requires at most 2N−1 different configurations. The approaches herein can be successfully deployed in real architectures and provide worst-case performance guarantees.

Embodiments may be used to control the switch fabric in any input or combined input and output queued switch including software switches. The approaches herein may be implemented in a centralized or a distributed fashion.

Various embodiments provide a variety of technical advantages. The approaches provide low complexity that is not dependent upon the switch size. The approaches provide bounded delay for all packets. The approaches have good provable worst-case performance guarantees and are amenable to distributed implementation at wire speed. The non-preemptive scheduling approach does not require use of packet reassembly buffers at the output ports.

4.0 Implementation Mechanisms—Hardware Overview

Figure 5:
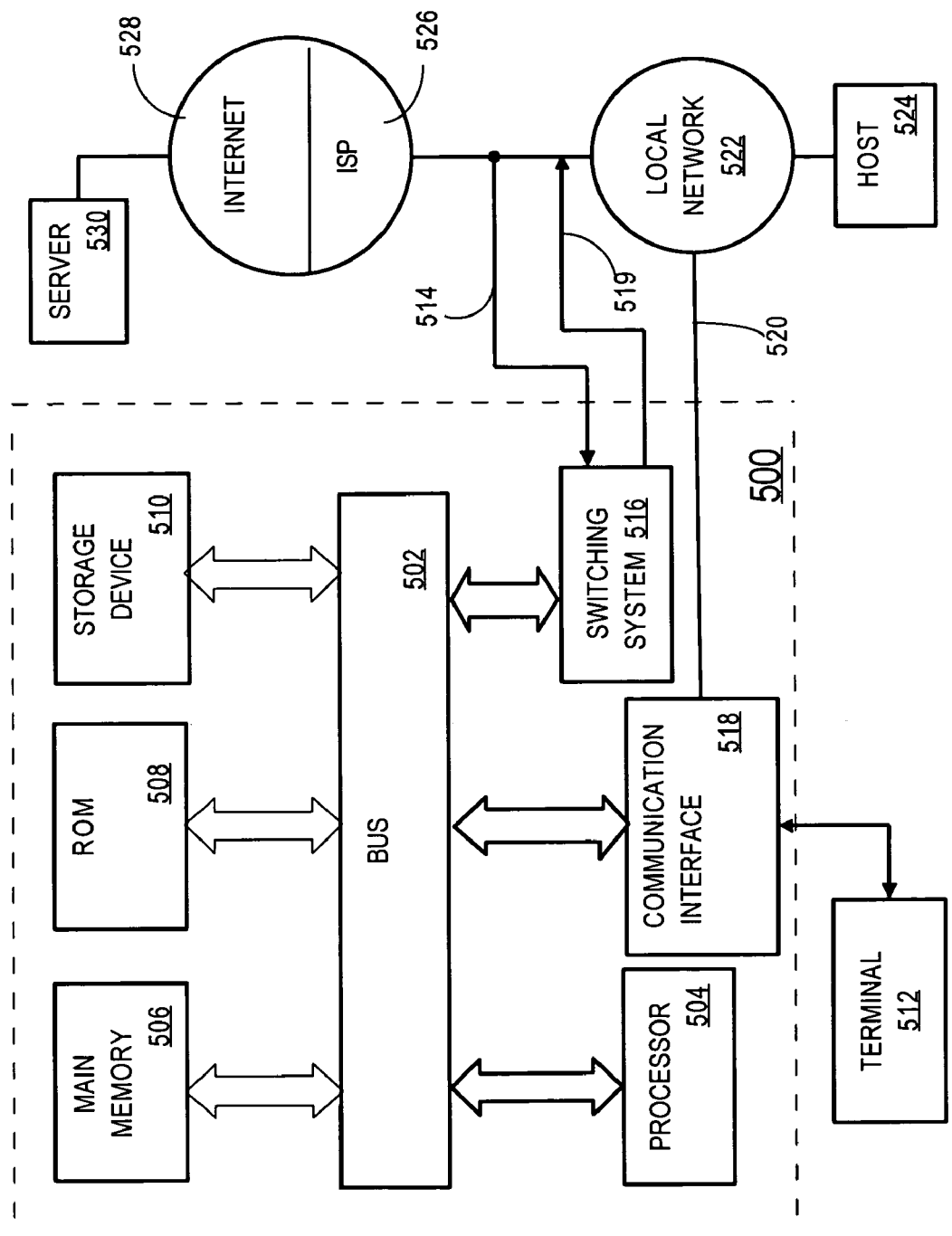
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for non-preemptive scheduling in a network element. According to one embodiment of the invention, non-preemptive scheduling in a network element is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for non-preemptive scheduling in a network element as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method providing non-preemptive scheduling in a network element, comprising the computer-implemented steps of:
   creating and storing a graph, wherein edges represent cells of an optical crossbar switch directed from inputs to outputs thereof, wherein each of the edges has an associated weight value, wherein weight values represent occupancy of a corresponding input queue of the optical switch;
   creating and storing a matching that includes a plurality of edges;
   adding, to the matching, all edges that are compatible with the matching, in order of decreasing weight;
   marking in the graph as covered all the edges that have been added to the matching; and
   repeating the preceding three steps until all the edges in the graph are covered;
   wherein the computer-implemented steps are performed by one or more computing devices comprising one or more processors.

2. A method as recited in claim 1, further comprising selecting a maximum of the weights of all edges in a matching as a holding time value for the matching.

3. A method as recited in claim 2, further comprising creating and storing a schedule for the optical crossbar switch, wherein the schedule comprises all the matchings and associated holding time values.

4. A method as recited in claim 1, further comprising:
   accumulating a plurality of data packets into a first batch among a plurality of traffic batches;
   creating and storing a schedule for the first batch using the first five steps hereof, wherein a maximum of the weights of all edges in a matching is selected as a holding time value for the matching, wherein the schedule comprises all the matchings and associated holding time values;
   transmitting the plurality of data packets of the first batch from the inputs to the outputs according to the schedule;
   repeating the preceding three steps for all other traffic batches.

5. A method as recited in claim 1, further comprising:
   marking all data packets in one or more input queues of the optical switch as a first traffic batch;
   creating and storing a schedule for the first traffic batch using the first five steps hereof, wherein a maximum of the weights of all edges in a matching is selected as a holding time value for the matching, wherein the schedule comprises all the matchings and associated holding time values;
   transferring the data packets from the input queues to the outputs according to the schedule;
   repeating the preceding three steps for all other traffic batches.

6. A method as recited in claim 5, wherein all unmarked packets that are in the same queue as used for a particular matching are added to a particular edge of the matching such that a total first weight of the particular edge is less than a maximum edge in the matching.

7. A method as recited in claim 1, implemented in a distributed system wherein a first processor performs the step of creating and storing a graph, and a second processor performs the other steps.

8. A method providing non-preemptive scheduling in a network element, comprising the computer-implemented steps of:
   creating and storing a traffic demand matrix, wherein rows of the matrix represent inputs to an optical crossbar switch, columns of the matrix represent outputs, and values in the matrix represent quantities of cells directed from associated inputs to associated outputs;
   creating and storing a graph based on the traffic demand matrix, wherein edges represent cells of an optical crossbar switch directed from inputs to outputs thereof, wherein each of the edges has an associated weight value, wherein weight values represent occupancy of a corresponding input queue of the optical switch;
   creating and storing a first matching that includes a plurality of edges;
   identifying a heaviest uncovered edge in the graph and placing the heaviest uncovered edge in the first matching;
   creating one or more other matchings;
   adding, to a particular one of the other matchings, all other edges that are compatible with that particular matching, in order of decreasing weight;
   marking in the graph as covered all the edges that have been added to the matching; and
   repeating the preceding three steps until all the edges in the graph are covered;
   selecting a maximum of the weights of all edges in a matching as a holding time value for the matching;
   creating and storing a schedule for the optical crossbar switch, wherein the schedule comprises all the matchings and associated holding time values;
   wherein the computer-implemented steps are performed by one or more computing devices comprising one or more processors.

9. A method as recited in claim 8, further comprising:
   accumulating a plurality of data packets into a first batch among a plurality of traffic batches;
   creating and storing a schedule for the first batch using the first ten steps hereof;
   transmitting the plurality of data packets of the first batch from the inputs to the outputs according to the schedule;
   repeating the preceding three steps for all other traffic batches.

10. A method as recited in claim 8, further comprising:
    marking all data packets in one or more input queues of the optical switch as a first traffic batch;
    creating and storing a schedule for the first traffic batch using the first ten steps hereof, wherein a maximum of the weights of all edges in a matching is selected as a holding time value for the matching, wherein the schedule comprises all the matchings and associated holding time values;
    transferring the data packets from the input queues to the outputs according to the schedule;
    repeating the preceding three steps for all other traffic batches.

11. A method as recited in claim 10, wherein all unmarked packets that are in the same queue as used for a particular matching are added to a particular edge of the matching such that a total first weight of the particular edge is less than a maximum edge in the matching.

12. A method as recited in claim 8, implemented in a distributed system wherein a first processor performs the steps of creating a traffic demand matrix and creating a graph, a second processor performs the steps of creating the first matching, creating the other matchings, adding, marking, and repeating, and a third processor performs the steps of selecting a maximum, creating and storing a schedule.

13. An apparatus providing non-preemptive scheduling in a network element, comprising:
    one or more processors;
    means for creating and storing a graph, wherein edges represent cells of an optical crossbar switch directed from inputs to outputs thereof, wherein each of the edges has an associated weight value, wherein weight values represent occupancy of a corresponding input queue of the optical switch;
    means for creating and storing a matching that includes a plurality of edges;
    means for adding, to the matching, all edges that are compatible with the matching, in order of decreasing weight;
    means for marking in the graph as covered all the edges that have been added to the matching; and
    means for repeating the functions of the preceding three means until all the edges in the graph are covered.

14. An apparatus as recited in claim 13, further comprising means for selecting a maximum of the weights of all edges in a matching as a holding time value for the matching.

15. An apparatus as recited in claim 14, further comprising means for creating and storing a schedule for the optical crossbar switch, wherein the schedule comprises all the matchings and associated holding time values.

16. An apparatus as recited in claim 13, further comprising:
    means for accumulating a plurality of data packets into a first batch among a plurality of traffic batches;
    means for creating and storing a schedule for the first batch using the functions of the first five means hereof, wherein a maximum of the weights of all edges in a matching is selected as a holding time value for the matching, wherein the schedule comprises all the matchings and associated holding time values;
    means for transmitting the plurality of data packets of the first batch from the inputs to the outputs according to the schedule;
    means for repeating the functions of the preceding three means for all other traffic batches.

17. An apparatus as recited in claim 13, further comprising:
    means for marking all data packets in one or more input queues of the optical switch as a first traffic batch;
    means for creating and storing a schedule for the first traffic batch using the functions of the first five means hereof, wherein a maximum of the weights of all edges in a matching is selected as a holding time value for the matching, wherein the schedule comprises all the matchings and associated holding time values;
    means for transferring the data packets from the input queues to the outputs according to the schedule;
    means for repeating the functions of the preceding three means for all other traffic batches.

18. An apparatus as recited in claim 17, wherein all unmarked packets that are in the same queue as used for a particular matching are added to a particular edge of the matching such that a total first weight of the particular edge is less than a maximum edge in the matching.

19. An apparatus providing non-preemptive scheduling in a network element, comprising:

one or more processors;

means for creating and storing a traffic demand matrix, wherein rows of the matrix represent inputs to an optical crossbar switch, columns of the matrix represent outputs, and values in the matrix represent quantities of cells directed from associated inputs to associated outputs;

means for creating and storing a graph based on the traffic demand matrix, wherein edges represent cells of an optical crossbar switch directed from inputs to outputs thereof, wherein each of the edges has an associated weight value, wherein weight values represent occupancy of a corresponding input queue of the optical switch;

means for creating and storing a first matching that includes a plurality of edges;

means for identifying a heaviest uncovered edge in the graph and placing the heaviest uncovered edge in the first matching;

means for creating one or more other matchings;

means for adding, to a particular one of the other matchings, all other edges that are compatible with that particular matching, in order of decreasing weight;

means for marking in the graph as covered all the edges that have been added to the matching; and means for repeating the functions of the preceding three means until all the edges in the graph are covered;

means for selecting a maximum of the weights of all edges in a matching as a holding time value for the matching;

means for creating and storing a schedule for the optical crossbar switch, wherein the schedule comprises all the matchings and associated holding time values.

20. An apparatus as recited in claim 19, further comprising:

means for accumulating a plurality of data packets into a first batch among a plurality of traffic batches;

means for creating and storing a schedule for the first batch using the functions of the first ten means hereof;

means for transmitting the plurality of data packets of the first batch from the inputs to the outputs according to the schedule;

means for repeating the functions of the preceding three means for all other traffic batches.

21. An apparatus as recited in claim 19, further comprising:

means for marking all data packets in one or more input queues of the optical switch as a first traffic batch;

means for creating and storing a schedule for the first traffic batch using the functions of the first ten means hereof, wherein a maximum of the weights of all edges in a matching is selected as a holding time value for the matching, wherein the schedule comprises all the matchings and associated holding time values;

means for transferring the data packets from the input queues to the outputs according to the schedule;

means for repeating the functions of the preceding three means for all other traffic batches.

22. An apparatus as recited in claim 21, wherein all unmarked packets that are in the same queue as used for a particular matching are added to a particular edge of the matching such that a total first weight of the particular edge is less than a maximum edge in the matching.

23. One or more computer-readable storage media storing instructions which, when executed by one or more processors, cause the one or more processors to:

create and store a graph, wherein edges represent cells of an optical crossbar switch directed from inputs to outputs thereof, wherein each of the edges has an associated weight value, wherein weight values represent occupancy of a corresponding input queue of the optical switch;

create and store a matching that includes a plurality of edges;

add, to the matching, all edges that are compatible with the matching, in order of decreasing weight;

mark in the graph as covered all the edges that have been added to the matching; and repeat the preceding three steps until all the edges in the graph are covered;

wherein the instructions are to be executed by one or more computing devices comprising one or more processors.

24. One or more computer-readable storage media as recited in claim 23, storing further instructions which, when executed by the one or more processors, cause the one or more processors to:

select a maximum of the weights of all edges in a matching as a holding time value for the matching.

25. One or more computer-readable storage media as recited in claim 24, wherein the schedule comprises all the matchings and associated holding time values.

26. One or more computer-readable storage media as recited in claim 23, storing further instructions which, when executed by the one or more processors, cause the one or more processors to:

accumulate a plurality of data packets into a first batch among a plurality of traffic batches;

create and store a schedule for the first batch using the first five steps hereof, wherein a maximum of the weights of all edges in a matching is selected as a holding time value for the matching, wherein the schedule comprises all the matchings and associated holding time values;

transmit the plurality of data packets of the first batch from the inputs to the outputs according to the schedule;

repeat the preceding three steps for all other traffic batches.

27. One or more computer-readable storage media as recited in claim 23, storing further instructions which, when executed by the one or more processors, cause the one or more processors to:

mark all data packets in one or more input queues of the optical switch as a first traffic batch;

create and store a schedule for the first traffic batch using the first five steps hereof, wherein a maximum of the weights of all edges in a matching is selected as a holding time value for the matching, wherein the schedule comprises all the matchings and associated holding time values;

transfer the data packets from the input queues to the outputs according to the schedule;

repeat the preceding three steps for all other traffic batches.

28. One or more computer-readable storage media as recited in claim 27, wherein all unmarked packets that are in the same queue as used for a particular matching are added to a particular edge of the matching such that a total first weight of the particular edge is less than a maximum edge in the matching.

29. One or more computer-readable storage media storing instructions which, when executed by one or more processors, cause the one or more processors to:

create and store a traffic demand matrix, wherein rows of the matrix represent inputs to an optical crossbar switch, columns of the matrix represent outputs, and values in the matrix represent quantities of cells directed from associated inputs to associated outputs;

create and store a graph based on the traffic demand matrix, wherein edges represent cells of an optical crossbar switch directed from inputs to outputs thereof, wherein each of the edges has an associated weight value, wherein weight values represent occupancy of a corresponding input queue of the optical switch;

create and store a first matching that includes a plurality of edges;

identify a heaviest uncovered edge in the graph and placing the heaviest uncovered edge in the first matching;

create one or more other matchings;

add, to a particular one of the other matchings, all other edges that are compatible with that particular matching, in order of decreasing weight;

mark in the graph as covered all the edges that have been added to the matching; and repeat the preceding three steps until all the edges in the graph are covered;

select a maximum of the weights of all edges in a matching as a holding time value for the matching;

create and store a schedule for the optical crossbar switch, wherein the schedule comprises all the matchings and associated holding time values;

wherein the instructions are to be executed by one or more computing devices comprising one or more processors.

30. One or more computer-readable storage media as recited in claim 29, storing further instructions which, when executed by the one or more processors, cause the one or more processors to:

accumulate a plurality of data packets into a first batch among a plurality of traffic batches;

create and store a schedule for the first batch using the first ten steps hereof;

transmit the plurality of data packets of the first batch from the inputs to the outputs according to the schedule;

repeat the preceding three steps for all other traffic batches.

31. One or more computer-readable storage media as recited in claim 29, storing further instructions which, when executed by the one or more processors, cause the one or more processors to:

mark all data packets in one or more input queues of the optical switch as a first traffic batch;

create and store a schedule for the first traffic batch using the first ten steps hereof, wherein a maximum of the weights of all edges in a matching is selected as a holding time value for the matching, wherein the schedule comprises all the matchings and associated holding time values;

transfer the data packets from the input queues to the outputs according to the schedule;

repeat the preceding three steps for all other traffic batches.

32. One or more computer-readable storage media as recited in claim 31, wherein all unmarked packets that are in the same queue as used for a particular matching are added to a particular edge of the matching such that a total first weight of the particular edge is less than a maximum edge in the matching.

* * * * *